United States Patent
Smail

(10) Patent No.: US 12,073,626 B1
(45) Date of Patent: Aug. 27, 2024

(54) ANALYTICS FOR DETECTION OF FLUID LEAKS BY PREMISES MONITORING SYSTEMS

(71) Applicant: The ADT Security Corporation, Boca Raton, FL (US)

(72) Inventor: David Smail, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/517,637

(22) Filed: Nov. 22, 2023

(51) Int. Cl.
*G06V 20/52* (2022.01)
*G06V 20/40* (2022.01)

(52) U.S. Cl.
CPC .............. *G06V 20/52* (2022.01); *G06V 20/44* (2022.01)

(58) Field of Classification Search
CPC .............................. G06V 20/52; G06V 20/44
See application file for complete search history.

(56) References Cited

U.S. PATENT DOCUMENTS

| | | | |
|---|---|---|---|
| 10,527,516 | B2 | 1/2020 | Banerjee et al. |
| 11,100,264 | B2 | 8/2021 | Cohen |
| 11,221,107 | B2 | 1/2022 | Du et al. |
| 11,288,936 | B1* | 3/2022 | Kumar ................. B64C 39/024 |
| 11,662,267 | B2 | 5/2023 | Rudd et al. |
| 2016/0024759 | A1* | 1/2016 | Vinjamaram ........... E03B 7/071 137/12 |
| 2017/0292893 | A1 | 10/2017 | Bunker et al. |
| 2019/0025150 | A1 | 1/2019 | Picardi et al. |
| 2020/0103306 | A1* | 4/2020 | Mine ...................... G01M 3/007 |
| 2020/0151833 | A1* | 5/2020 | Bellaish ................. G06Q 40/03 |
| 2021/0079630 | A1 | 3/2021 | Poojary et al. |
| 2021/0164860 | A1 | 6/2021 | Young |
| 2021/0216852 | A1 | 7/2021 | Reece et al. |
| 2023/0035710 | A1* | 2/2023 | Szczepanski ........ G08B 26/007 |
| 2023/0060059 | A1 | 2/2023 | Kornbluth et al. |
| 2023/0111766 | A1* | 4/2023 | Kasamatsu .......... G01N 33/383 73/584 |

FOREIGN PATENT DOCUMENTS

| | | | | |
|---|---|---|---|---|
| JP | 2016188877 | * | 11/2016 | .............. G01M 3/04 |
| JP | 2019049485 | * | 3/2019 | .............. G01M 3/06 |
| WO | 2022168040 A1 | | 8/2022 | |
| WO | 2022169554 A1 | | 8/2022 | |

* cited by examiner

*Primary Examiner* — Amara Abdi
(74) *Attorney, Agent, or Firm* — Weisberg I.P. Law. P.A.

(57) ABSTRACT

A system configured to communicate with a plurality of premises monitoring systems. The system includes at least one processor configured to, for each premises monitoring system of a first subset of the premises monitoring systems, receive premises data comprising flood sensor data indicating that a potential water leak, receive user confirmation data confirming that a water leak event occurred at the premises, identify at least one camera associated with the premises monitoring system that captured video of at least a portion of the water leak event, and collect the video captured by the at least one camera. A machine learning (ML) model is trained using the video collected from each premises monitoring system of the first subset of the premises monitoring systems. The ML model is deployed to at least a second subset of the plurality of premises monitoring systems for detecting a water leak.

20 Claims, 8 Drawing Sheets

ANALYTICS FOR DETECTION OF FLUID LEAKS BY PREMISES MONITORING SYSTEMS

TECHNICAL FIELD

The present technology is generally related to analytics to detect fluid leaks.

BACKGROUND

Typically, a premises, such as a home, an office building, an industrial facility, etc., has piping that delivers water, such as potable water for human consumption, or directs wastewater away from the premises for treatment. Other piping may contain other fluids, such as natural gas, for various purposes. In some cases, fluid leaks resulting from damaged piping, incorrect fittings, or deteriorating pipe joints or valves may cause damage to property. In some other cases, damage to the property is caused by roof leaks, floods, or other events.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The present disclosure relates to analytics of media and/or other data to detect leaks (e.g., fluid leaks) and mitigate property damage.

Some embodiments involve using image, video and/or audio analytics to detect leaks and/or impeding leaks. For example, one or more machine learning (ML) models can be trained to recognize signs or indications of water leaks and impending water leaks in still image, video, and/or audio data. After an ML model has been trained, the ML model can be deployed on local devices of a premises monitoring system and/or in remote server-based analytics systems for monitoring leaks. If a leak or impending leak is detected, various responsive actions can be initiated.

Figure 1:
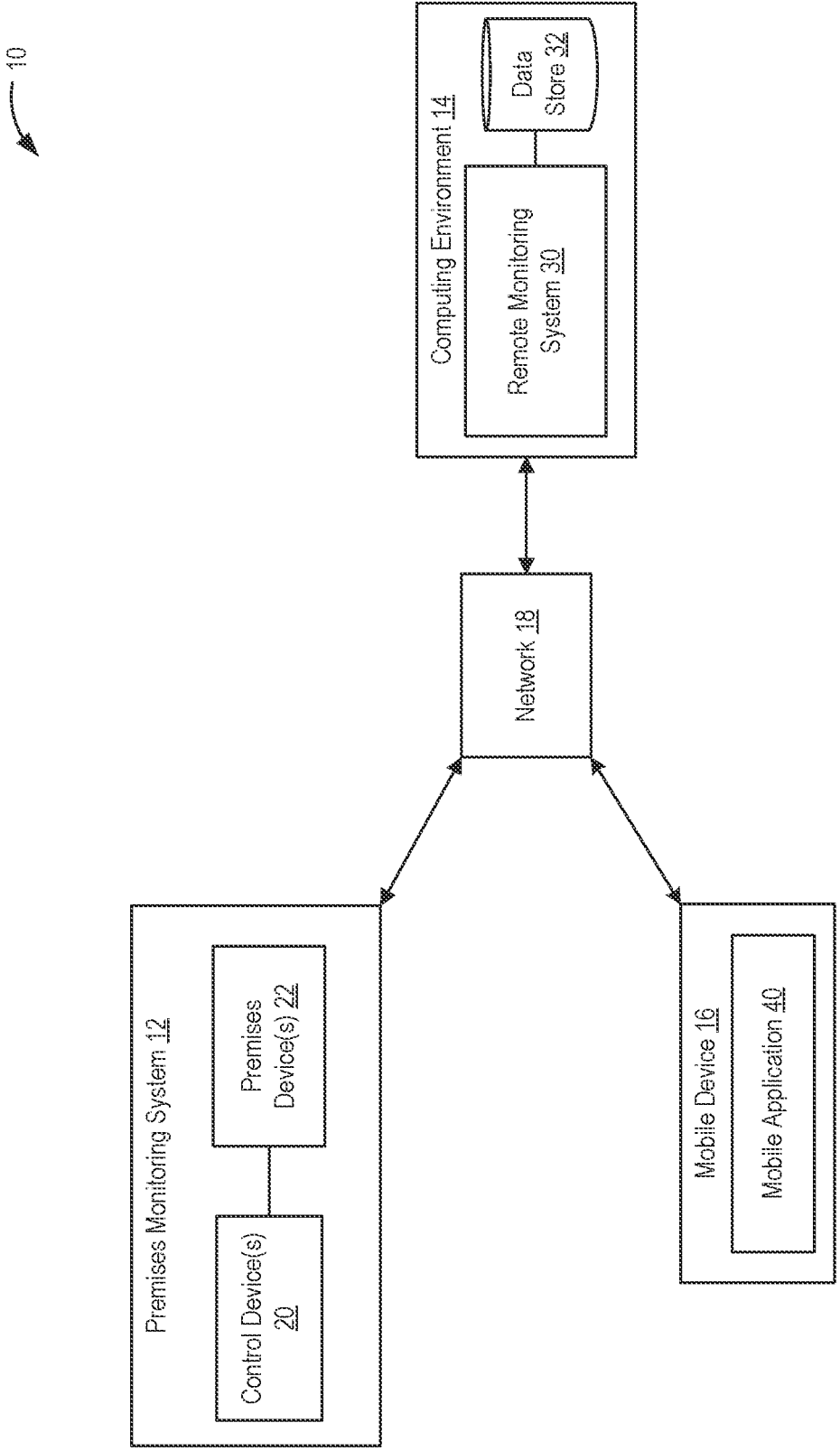
FIG. 1 is a block diagram of an example system according to some embodiments of the present disclosure.

With reference to FIG. 1, shown is a block diagram of an example system 10 according to some embodiments of the present disclosure. System 10 may include premises monitoring system 12, computing environment 14, mobile device 16, and network 18. In some embodiments, system 10 includes more than one premises monitoring system 12. Each premises monitoring system 12 may include at least one control device 20 and at least one premises device 22. Computing environment 14 may include remote monitoring system 30 and data store 32.

Any of the components of system 10 may be configured to communicate with another component of system 10. For example, premises monitoring system 12 and/or control device 20 and/or premises device 22 may be configured to communicate with computing environment 14, remote monitoring system 30, and/or data store and mobile device 16 via network 18.

Network 18 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks. Network 18 may support one or more communication protocols, one or more wired communication links, one or more wireless communication links, etc.

Premises monitoring system 12 may be configured to provide functionality relating to premises monitoring. For example, premises monitoring system 12 may be used to detect burglaries, smoke, fires, carbon monoxide leaks, water leaks, etc. and report detected events to remote monitoring system 30. Additionally, the premises monitoring functionality performed by premises monitoring system 12 may include home automation functionality. Examples of home automation functionality include thermostat control, door lock control, lighting control, appliance control, entertainment system control, etc.

Control device 20 may be configured to control various aspects of premises monitoring system 12. For example, control device 20 may be configured to control premises devices 22, such as locks, doors, windows, actuators, valves, motors, and any other controllable devices associated with premises monitoring system 12. Control device 20 may include a user interface, such as buttons, a touch screen, a display, a microphone, a speaker, and/or other types of user interface components, to facilitate a user interacting with and controlling premises monitoring system 12. According to various embodiments, control device 20 may be, or include, a wall-mountable panel device (e.g., a wall-mounted alarm system panel), a tabletop panel device (e.g., a tabletop alarm system panel), a gateway device, a hub, a keypad, a remote control, and/or another type of device configured to control aspects of premises monitoring system 12. Additionally, in some embodiments, mobile application 40 installed in mobile device 40 may provide functionality for monitoring and/or controlling aspects of premises monitoring system 12. Accordingly, mobile device 16 may be a control device 20 in various embodiments.

In some embodiments, control device 20 may be configured to receive an ML model from computing environment 14, detect or cause a premises device 22 to detect a leak in the premises using the ML model, and perform at least one action in response to the leak detection. A leak may include a gas or liquid leak. For example, a gas leak may include a natural gas leak, a chlorine gas leak, propane leak, etc. A leak of a liquid may include a water leak, an acid leak, an oil leak, etc. In addition, control device 20 and/or computing environment 14 may be configured to obtain, store, and transmit premises data, which may include records or data associated with premises device 22. The records may include records associated with fluid usage, such as water consumption, records comprising information about the premises monitoring system (e.g., system status, system configuration, account information, location information, information about premises devices 22, etc.), and any other type of records. Data associated with premises device 22 may include real-time sensor data or historical sensor data.

Premises device 22 may include sensors, devices configured to capture audio, images, and/or video, and/or other devices. For example, premises devices 22 may include motion sensors, fire sensors, smoke sensors, heat sensors, carbon monoxide sensors, flood sensors, flow sensors, level sensors, temperature sensors, humidity sensors, proximity sensors, contact sensors, glass break sensors, water consumption sensors, water pressure sensors, etc. Devices configured to capture audio, images, and/or video may be referred to as media devices and may include still image cameras, video cameras, microphones, etc. Additional examples of premises devices 22 include sirens, garage door controllers, doorbells, temperature sensors, humidity sensors, lighting devices, switches, electrical outlets, and electrical plugs.

In some embodiments, premises devices 22 may be configured to collect, generate and/or provide data for training an ML model. The training data may include media data, such as images, videos, and/or audio. For example, media data used to train an ML model may include video, images, and/or audio of at least one of: (A) a fluid pooling on the floor from a water leak; (B) a fluid spraying or dripping out of a pipe; (C) a fluid dripping or spraying down from ceilings and walls; (D) sagging ceilings resulting from fluid leaks, (E) discolorations on ceilings, walls, and floors caused by fluid leaks; or (F) mold growing on ceilings, walls, and floors caused by fluid leaks; pipes or valves before, during, and after a failure event. Other sensor data may also be used as training data. For example, data from temperature sensors, humidity sensors, and/or other premises devices 22 may be used to train an ML model in various embodiments of the present disclosure. In various embodiments, media data (e.g., audio, video, still images, etc.) and temperature data, humidity data, and/or other sensor data may be used to train an ML model for the purposes of detecting fluid leaks.

Further, one or more premises devices 22 may be configured to receive an ML model trained using training data. The ML model may be received from computing environment 14 or control device 20. Premises device 22 may detect or cause another premises device 22 to detect a leak in the premises using the ML model and perform at least one action in response to the leak detection. Any of the actions performed by premises device 22 or control device 20 may include transmitting a notification to computing environment 14 or mobile device 16 about the leak. Information about the detected leak may be provided to an agent of the computing environment 14, the owner of the premises, a tenant of the premises, etc. In addition, if the premises has a premises device 22 that is a control valve for the source of the leak, control device 20 can cause the control valve to be closed to mitigate damage from the leak.

Remote monitoring system 30 of computing environment 14 may be configured to provide remote monitoring services for multiple premises monitoring systems 12. For example, in the event that an open door, open window, glass break, etc. is detected by a premises device 22 when a premises monitoring system 12 is in an armed state, the premises monitoring system 12 may transmit an alarm signal to remote monitoring system 30. In response, an agent associated with remote monitoring system 30 may notify first responders, such as police, fire, emergency medical responders, etc., and/or one or more designated users associated with the premise monitoring system 12.

Remote monitoring system 30 may also be configured to collect media data and/or other data from at least one premises device 22 associated with at least one premises having a confirmed leak. The leak may be confirmed using a record associated with each premises, sensor data, or based on an indication received from mobile device 16 confirming that the leak at the premises has been observed by a user of mobile device 16. Remote monitoring system 30 may also be configured to train an ML model using data from one or more premises devices 22 associated with a confirmed leak. For example, remote monitoring system 30 may use still images, video, and/or audio, or other data from premises devices 22, to train one or more ML models to detect various signs of water leaks and/or impending water leaks. To this end, images, videos, audio, temperature data, humidity data, and/or other types of data from premises where confirmed water leaks have occurred can be collected, labeled, and fed into ML model training algorithms.

The ML models can also be continuously refined and updated based on data subsequently collected after the trained ML models have been deployed. For example, remote monitoring system 30 may use data associated with confirmed leaks, false leak detections and/or leaks that failed to be detected to refine and improve the accuracy of the ML models.

Remote monitoring system 30 may also be configured to deploy trained ML models to premises monitoring systems 12 for detecting leaks and mitigating the leaks. In various embodiments, remote monitoring system 30 may deploy a ML model to control devices 20, premises devices 22 of the premises monitoring system 12, or any other devices. For example, after an ML model has been trained, the ML model can be deployed and used in premises monitoring systems 12 for the purposes of detecting fluid leaks and/or impending fluid leaks. According to various embodiments, ML models can be deployed locally on devices located in the premises, such as control devices 20 and/or premises devices 22, or remotely in server-based analytics systems, such as a server of computing environment 14 or a third party server. Examples of local devices on which ML models can be deployed include alarm system panels, alarm system hubs, surveillance cameras, devices with microphones, and/or other devices. In some embodiments, if a leak or impending leak is detected, various actions can occur. For example, a control device 20 can transmit a notification to remote monitoring system 30 and/or mobile device 16 to facilitate notifying the premises owner, premises resident, and/or another designated person.

Data store 32 may at least temporarily store data for retrieval, management and/or analysis. In particular, data store 32 may be configured to at least temporarily store data associated with computing environment 14 and premises monitoring systems 12. As examples, the data stored in the data store 32 can include, but is not limited to, ML models, media data, records, sensor data, data associated with premises monitoring system 12, data associated with mobile device 16, and other types of data. Data store 32 may also store information associated with confirmed cases of leaks, which the remote monitoring system 30 may use to train ML models, as described herein.

Mobile device 16 may be a smartphone, tablet computer, personal computer, wearable device, or another type of device that a user can operate to communicate and interact with a premises monitoring system 12 and remote monitoring system 30. Mobile application 40 (which may include one or more software applications) may be installed in mobile device 16, and can be used to control, monitor, and/or interact with various aspects of a premises monitoring system 12 and/or remote monitoring system 30. Mobile application 40 may also render one or more user interfaces that may facilitate a user confirming that a leak has occurred and may provide additional information. The indication may include information about the premises monitoring system 12 and/or the leak event, such as the location where the event occurred, the location of premises devices 22 in proximity to the location of the event, etc.

Figure 2:
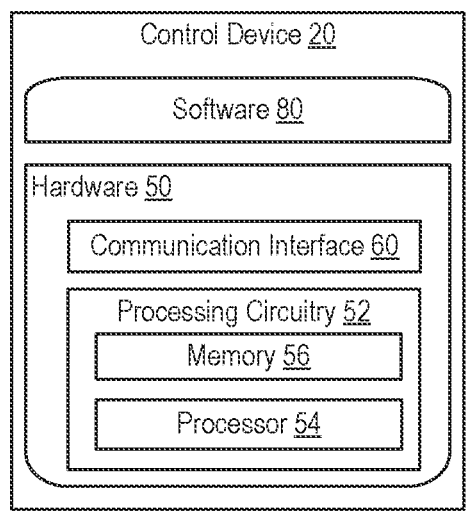
FIG. 2 is a block diagram of an example control device of the system of FIG. 1 according to various embodiments of the present disclosure.

Referring to FIG. 2, shown is a block diagram illustrating an example control device 20 of premises monitoring system 12. As shown, control device 20 comprises hardware 50. The hardware 50 may include processing circuitry 52. The processing circuitry 52 may include one or more processors 54 and one or more memories 56. Each processor 54 may include and/or be associated with one or more central processing units, data buses, buffers, and interfaces to facilitate operation. In addition to or instead of a processor 54 and memory 56, the processing circuitry 52 may comprise other types of integrated circuitry that performs various functionality. Integrated circuitry may include one or more processors 54, processor cores, field programmable gate arrays (FPGAs), application specific integrated circuits (ASICs), graphics processing units (GPUs), Systems on Chips (SoCs), or other components configured to execute instructions. The processor 64 may be configured to access (e.g., write to and/or read from) the memory 56, which may comprise any kind of volatile and/or nonvolatile memory, e.g., cache, buffer memory, random access memory (RAM), read-only memory (ROM), optical memory, and/or erasable programmable read-only memory (EPROM). Further, memory 56 may be embodied in the form of one or more storage devices. The processing circuitry 52 may be configured to perform various functionality described herein. For example, computer instructions may be stored in memory 56 and/or another computer-readable medium that, when executed by processor 54, causes the processor 54 to perform various functionality described herein.

Hardware 50 may include communication interface 60 enabling control device 20 to communicate with one or more elements in system 10. For example, communication interface 60 may be configured for establishing and maintaining at least a wireless or wired connection with one or more elements of system 10 such as premises device 22 or computing environment 14 or mobile device 16.

Control device 20 further has software 80 (which may include one or more software applications) stored internally in, for example, memory 56, or stored in external memory (e.g., database, storage array, network storage devices, etc.) accessible by the control device 20 via an external connection. Software 80 may include any software or program that configures processing circuitry 52 to perform the steps or processes of the present disclosure.

The processing circuitry 52 may be configured to control any of the methods and/or processes described herein and/or to cause such methods, and/or processes to be performed, e.g., by control device 20. Processor 54 corresponds to one or more processors 54 for performing control device 20 functions described herein. The memory 56 is configured to store data and/or files such as remote monitoring computing environment data and/or other information/data. In some embodiments, the software 80 may include instructions that, when executed by the processor 54 and/or processing circuitry 52, causes the processor 54 and/or processing circuitry 52 to perform the processes described herein with respect to control device 20. Accordingly, by having computer instructions stored in memory 56 accessible to the processor 54, the processor 54 may be configured to perform the actions described herein.

Figure 3:
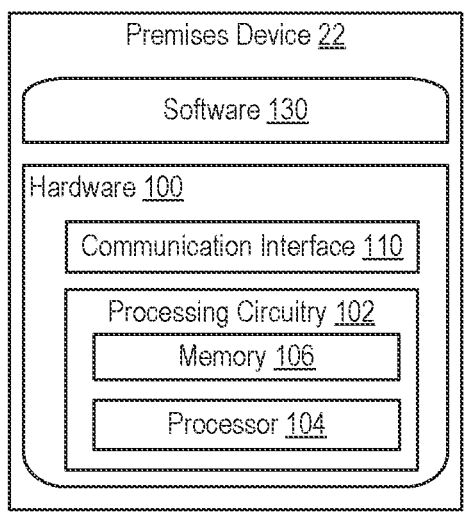
FIG. 3 is a block diagram of an example premises device of the system of FIG. 1 according to various embodiments of the present disclosure.

FIG. 3 is a block diagram illustrating an example premises device 22 of premises monitoring system 12. As shown, premises device 22 comprises hardware 100. The hardware 100 may include processing circuitry 102. The processing circuitry 102 may include one or more processors 104 and one or more memories 106. Each processor 104 may include and/or be associated with one or more central processing units, data buses, buffers, and interfaces to facilitate operation. In addition to or instead of a processor 104 and memory 106, the processing circuitry 102 may comprise other types of integrated circuitry that performs various functionality. Integrated circuitry may include one or more processors 104, processor cores, FPGAs, ASICs, GPUs, SoCs, or other components configured to execute instructions. The processor 64 may be configured to access (e.g., write to and/or read from) the memory 106, which may comprise any kind of volatile and/or nonvolatile memory, e.g., cache, buffer memory, RAM, ROM, optical memory, and/or EPROM. Further, memory 106 may be embodied in the form of one or more storage devices. The processing circuitry may be configured to perform various functionality described herein. For example, computer instructions may be stored in memory 106 and/or another computer-readable medium that, when executed by processor 104, causes the processor 104 to perform various functionality.

Hardware 100 may include communication interface 110 enabling premises device 22 to communicate with one or more elements in system 10. For example, communication interface 110 may be configured for establishing and maintaining at least a wireless or wired connection with one or more elements of system 10 such as control device 20 or computing environment 14 or mobile device 16.

Premises device 22 further has software 130 (which may include one or more software applications) stored internally in, for example, memory 106, or stored in external memory (e.g., database, storage array, network storage devices, etc.) accessible by the premises device 22 via an external connection. Software 130 may include any software or program that configures processing circuitry 102 to perform the steps or processes of the present disclosure.

The processing circuitry 102 may be configured to control any of the methods and/or processes described herein and/or to cause such methods, and/or processes to be performed, e.g., by premises device 22. Processor 104 corresponds to one or more processors 104 for performing premises device 22 functions described herein. The memory 106 is configured to store data and/or files such as remote monitoring computing environment data and/or other information/data. In some embodiments, the software 130 may include instructions that, when executed by the processor 104 and/or processing circuitry 102, causes the processor 104 and/or processing circuitry 102 to perform the processes described herein with respect to premises device 22. Accordingly, by having computer instructions stored in memory 106 accessible to the processor 104, the processor 104 may be configured to perform the actions described herein.

Figure 4:
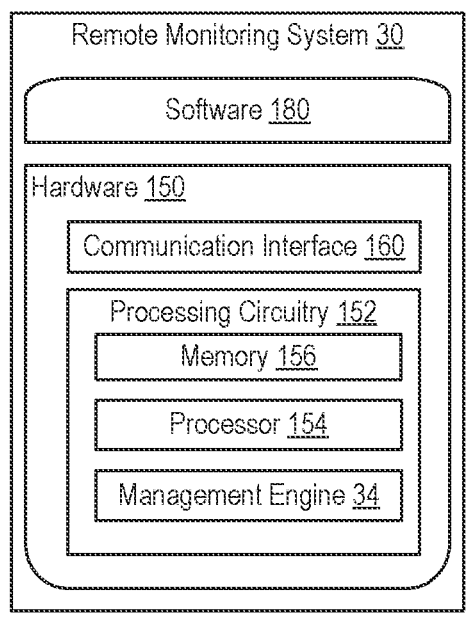
FIG. 4 is a block diagram of an example remote monitoring system of the system of FIG. 1 according to various embodiments of the present disclosure.

FIG. 4 is a block diagram illustrating an example remote monitoring system 30 of computing environment 14. The remote monitoring system 30 may be provided by one or more servers. According to various embodiments, the servers can be located in a single geographical location (e.g., building) or distributed across multiple geographic locations. In some embodiments, the servers can operate as part of an elastic computing resource in which the allotted capacity of computing-related resources may vary over time.

As shown, remote monitoring system 30 comprises hardware 150. The hardware 150 may include processing circuitry 152. The processing circuitry 152 may include one or more processors 154 and one or more memories 106. Each processor 154 may include and/or be associated with one or more central processing units, data buses, buffers, and interfaces to facilitate operation. In addition to or instead of a processor 154 and memory 156, the processing circuitry 152 may comprise other types of integrated circuitry that performs various functionality. Integrated circuitry may include one or more processors 154, processor cores, FPGAs, ASICs, GPUs, SoCs, or other components configured to execute instructions. The processor 64 may be configured to access (e.g., write to and/or read from) the memory 156, which may comprise any kind of volatile and/or nonvolatile memory, e.g., cache, buffer memory, RAM, ROM, optical memory, and/or EPROM. Further, memory 156 may be embodied in the form of one or more storage devices. The processing circuitry may be configured to perform various functionality described herein. For example, computer instructions may be stored in memory 156 and/or another computer-readable medium that, when executed by processor 154, causes the processor 154 to perform various functionality.

Hardware 150 may include communication interface 160 enabling remote monitoring system 30 to communicate with one or more elements in system 10. For example, communication interface 160 may be configured for establishing and maintaining at least a wireless or wired connection with one or more elements of system 10 such as control device 20, premises device 22, data store 32, or mobile device 16.

Remote monitoring system 30 further has software 180 (which may include one or more software applications) stored internally in, for example, memory 106, or stored in external memory (e.g., database, storage array, network storage devices, etc.) accessible by the remote monitoring system 30 via an external connection. Software 180 may include any software or program that configures processing circuitry 152 to perform the steps or processes of the present disclosure.

The processing circuitry 152 may be configured to control any of the methods and/or processes described herein and/or to cause such methods, and/or processes to be performed, e.g., by remote monitoring system 30. Processor 154 corresponds to one or more processors 154 for performing remote monitoring system 30 functions described herein. The memory 156 is configured to store data and/or files such as remote monitoring computing environment data and/or other information/data. In some embodiments, the software 180 may include instructions that, when executed by the processor 154 and/or processing circuitry 152, causes the processor 154 and/or processing circuitry 152 to perform the processes described herein with respect to remote monitoring system 30. Accordingly, by having computer instructions stored in memory 156 accessible to the processor 154, the processor 154 may be configured to perform the actions described herein. Further, engine management engine 34 of remote monitoring system 30 may be configured to perform any task, step, process, function, etc. associated with remote monitoring system 30.

Figure 5:
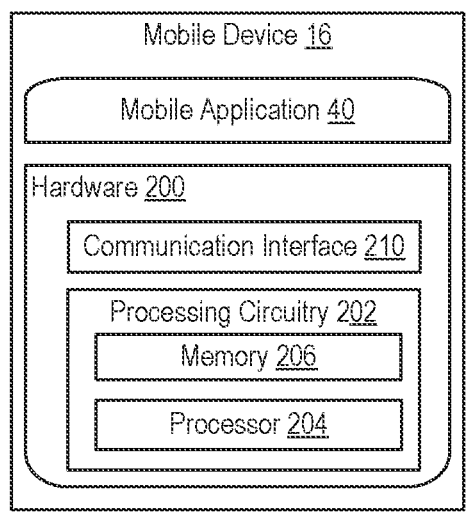
FIG. 5 is a block diagram of an example mobile device of the system of FIG. 1 according to various embodiments of the present disclosure.

FIG. 5 shows a block diagram illustrating an example mobile device 16 of system 10. As shown, mobile device 16 comprises hardware 200. The hardware 100 may include processing circuitry 202. The processing circuitry 202 may include one or more processors 204 and one or more memories 206. Each processor 204 may include and/or be associated with one or more central processing units, data buses, buffers, and interfaces to facilitate operation. In addition to or instead of a processor 204 and memory 206, the processing circuitry 202 may comprise other types of integrated circuitry that performs various functionality. Integrated circuitry may include one or more processors 204, processor cores, FPGAs, ASICs, GPUs, SoCs, or other components configured to execute instructions. The processor 64 may be configured to access (e.g., write to and/or read from) the memory 206, which may comprise any kind of volatile and/or nonvolatile memory, e.g., cache, buffer memory, RAM, ROM, optical memory, and/or EPROM. Further, memory 206 may be embodied in the form of one or more storage devices. The processing circuitry may be configured to perform various functionality described herein. For example, computer instructions may be stored in memory 206 and/or another computer-readable medium that, when executed by processor 204, causes the processor 204 to perform various functionality.

Hardware 200 may include communication interface 210 enabling mobile device 16 to communicate with one or more elements in system 10. For example, communication interface 210 may be configured for establishing and maintaining at least a wireless or wired connection with one or more elements of system 10 such as control device 20 or computing environment 14 or mobile device 16.

The processing circuitry 202 may be configured to control any of the methods and/or processes described herein and/or to cause such methods, and/or processes to be performed, e.g., by mobile device 16. Processor 204 corresponds to one or more processors 204 for performing mobile device 16 functions described herein. The memory 206 is configured to store data and/or files such as remote monitoring computing environment data and/or other information/data. In some embodiments, the mobile application 40 (previously described with respect to FIG. 1) may include instructions that, when executed by the processor 204 and/or processing circuitry 202, causes the processor 204 and/or processing circuitry 202 to perform the processes described herein with respect to mobile device 16. Accordingly, by having computer instructions stored in memory 206 accessible to the processor 204, the processor 204 may be configured to perform the actions described herein.

Figure 6:
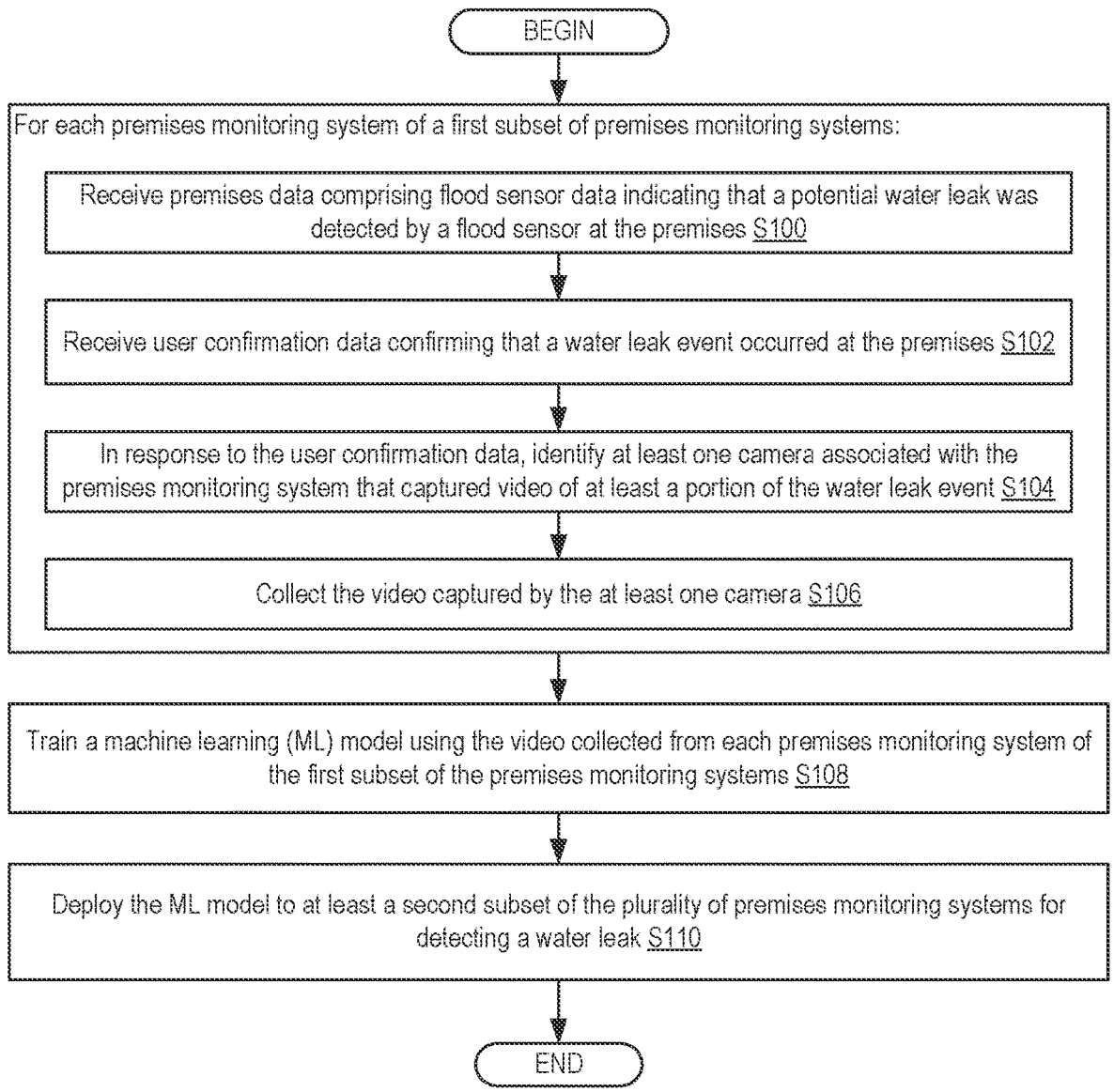
FIG. 6 is a flowchart depicting an example of functionality performed by components of the system of FIG. 1 according to some embodiments of the present disclosure.

FIG. 6 is a flowchart depicting an example of functionality performed by components of the system 10 (e.g., premises monitoring system 12 and its components, computing environment 14 and its components, or mobile device 16 and its components). More specifically, a system 10 is configured to communicate with a plurality of premises monitoring systems 12. Each of the plurality of premises monitoring systems 12 is configured to monitor a respective premises. The system 10 includes at least one processor 154, and at least one memory 156 storing instructions that, when executed by the at least one processor 154, are configured to cause the at least one processor 154 to, for each premises monitoring system 12 of a first subset of the premises monitoring systems 12, receive (Block S100) premises data comprising flood sensor data indicating that a potential water leak was detected by a flood sensor at the premises and receive (Block S102) user confirmation data confirming that a water leak event occurred at the premises. Further, the instructions are configured to cause the at least one processor 154 to, for each premises monitoring system 12 of a first subset of the premises monitoring systems 12, in response to the user confirmation data, identify (Block S104) at least one camera associated with the premises monitoring system that captured video of at least a portion of the water leak event and collect (Block S106) the video captured by the at least one camera. The instructions are further configured to cause the at least one processor 154 to train (Block S108) a machine learning (ML) model using the video collected from each premises monitoring system 12 of the first subset of the premises monitoring systems 12 and deploy (Block S110) the ML model to at least a second subset of the plurality of premises monitoring systems 12 for detecting a water leak.

In some embodiments, the instructions are further configured to cause the at least one processor to 152, for each premises monitoring system 12 of the plurality of premises monitoring systems 12, receive premises data indicating that a potential leak was detected, receive confirmation data confirming that a leak has occurred, where the confirmation data includes at least one of information about a location of the leak or information about the corresponding premises monitoring system 12, and collect the media data based on the confirmation data.

In some other embodiments, the confirmation data is based on user confirmation data obtained from a user device (e.g., mobile device 16).

In some embodiments, the instructions are further configured to cause the at least one processor 154 to, for each premises monitoring system 12 of the plurality of premises monitoring systems 12, identify at least one premises device 22 associated with the premises monitoring system 12. The media data is from the at least one premises device 22.

In some embodiments, the instructions are further configured to cause the at least one processor 154 to identify the at least one premises device 22 for each premises monitoring system 12 of the plurality of premises monitoring systems 12 based on information identifying the location of the leak.

In some other embodiments, the instructions are further configured to cause the at least one processor 154 to identify the at least one premises device 22 for each premises monitoring system 12 of the plurality of premises monitoring systems 12 based on user data obtained from the user device that identifies the at least one premises device 22.

In some embodiments, the instructions are further configured to cause the at least one processor 154 to deploy the trained ML model to execute on a control device 20 of at least one of the plurality of premises monitoring systems 12.

In some other embodiments, the media data from at least one premises device 22 of the plurality of premises devices 22 comprises video depicting water pooling on a floor.

In some embodiments, the media data from at least one premises device 22 of the plurality of premises devices 22 comprises video depicting water falling from a ceiling.

In some other embodiments, the media data from at least one premises device 22 of the plurality of premises devices 22 comprises video depicting a ceiling sagging from water.

In some embodiments, the media data from at least one premises device 22 of the plurality of premises devices 22 comprises video depicting at least one of a ceiling or a wall discolored from water.

Figure 7:
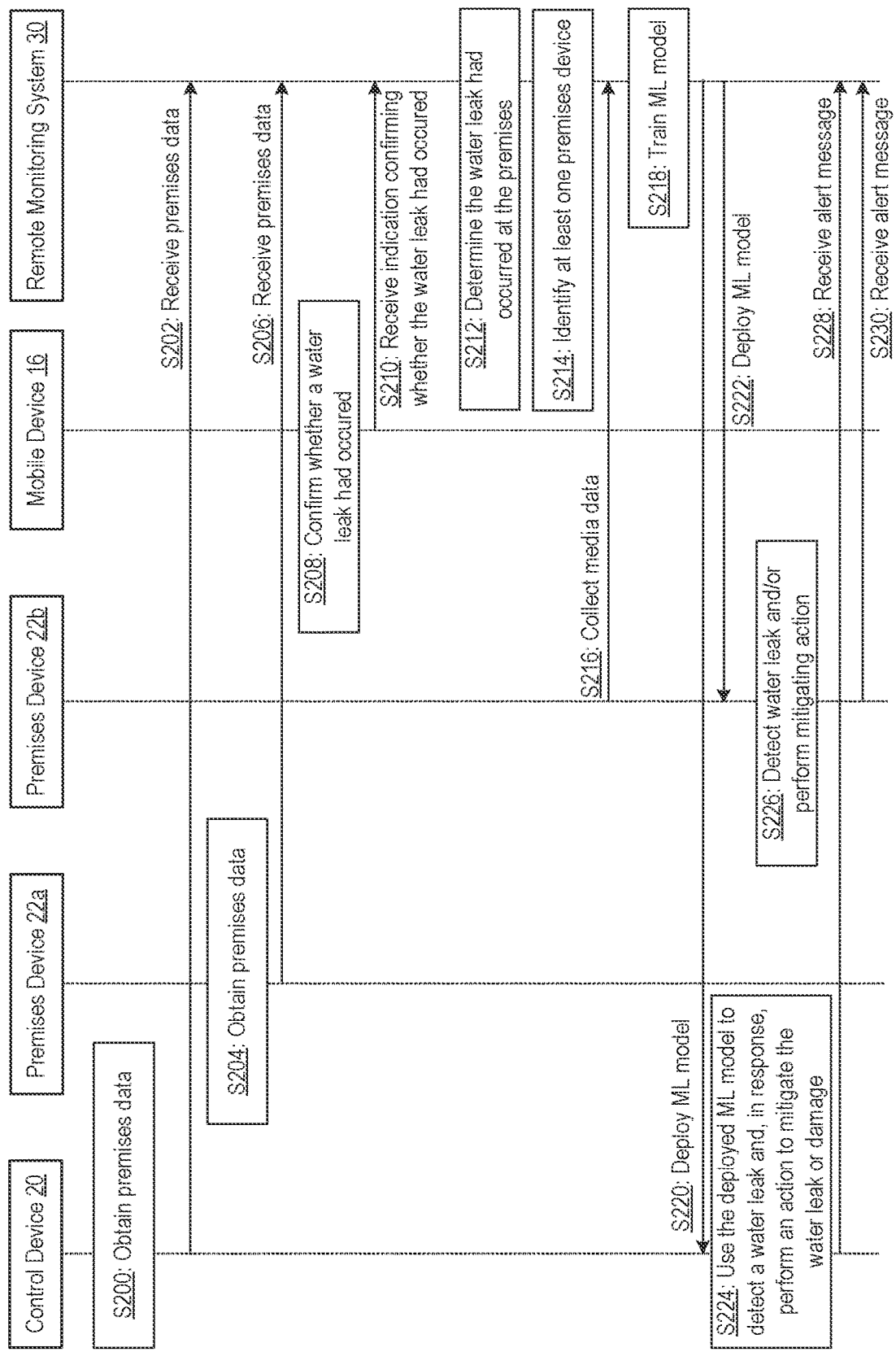
FIG. 7 is a sequence diagram depicting an example leak detection and mitigation process performed by components of the system of FIG. 1 according to some embodiments of the present disclosure.

FIG. 7 is a sequence diagram depicting an example leak detection and mitigation process according to some embodiments of the present disclosure. At step S200, control device 20 obtains premises data from one or more components of premises monitoring system 12. For example, premises data includes a record or historical sensor data for the premises in which the control device 20 is installed. The record may include information associated with a water bill such as average water consumption per month, day, or statement period. Historical sensor data may include data from a sensor. If the sensor is a flowmeter, historical sensor data may include flow totals, flow averages, rate of change of flow, etc., per minute, day, week, month, etc. If a sensor is a flood sensor, historical sensor data may include flood sensor data such as water level values or flood alarms indicating that a potential water leak was detected by the flood sensor at the premises. Premises data may also include the location of the sensor, time stamps of sensor measurements, alarm type, alarm acknowledgment information associated with an alarm acknowledged by a person at the premises via any of the components of system 10, etc. Other premises data indicative of a potential water leak may also be used. At step S202, remote monitoring system 30 receives premises data from control device 20. The premises data may also be obtained from one or more components of premises monitoring system 12, at step S204, by a premises device 22, such as premises device 22a. At step S206, the premises data is received from premises device 22a by remote monitoring system 30. At step S208, a user of mobile device 16 may further confirm whether a water leak had occurred at the premises. For example, a user may observe the water leak and may provide, via mobile application 40, an indication that confirms the occurrence of the water leak. At step S210, remote monitoring system 30 receives the indication confirming whether the water leak had occurred.

At step S212, remote monitoring system 30 may determine or confirm that the water leak had occurred at the premises based on the premises data received from any of the control device 20 and the premises device 22a, and the indication received from the mobile device 16. For example, a record in premises data may indicate that, on the first day of the current month, water consumption at the premises increased by a predetermined percentage above the average water consumption for the first day of each month over the past twelve months. Flow totals and flow averages for the first day of the current month may be used to confirm that the water consumption on the first day of the current month indicated in the record may correspond to a water leak. Further, alarms triggered by a flood sensor may be used to also corroborate or confirm that a water leak had occurred at the premises. The indication received from the mobile device 16 may further facilitate confirming the water leak as the user of mobile device 16 may access the premises, visually inspect the location of the water leak, provide a confirmation, and cause mobile device 16 to transmit the indication confirming the water leak. The indication may also include media data associated with the water leak such as images or video taken by the user using mobile device 16. Remote monitoring system 30, at step S214, identifies at least one premises device 22, such as premises device 22b, that can provide media data usable for training an ML model that can detect water leaks. For example, location of the sensor, time stamps of sensor measurements, alarm types, or alarm acknowledgment information may be used to identify a premises device 22 (e.g., camera) that captured data associated with a water leak. The identification of the premises device 22b may be further based on information about the premises device 22b, such as device location, device configuration, device capabilities, etc. At step S216, remote monitoring system 30 collects media data from the identified premises device 22a. For example, captured data may be collected and filtered based on information about when the water consumption increased, the time stamps of sensor measurements, time stamps of alarm acknowledgment, etc. At step S218, remote monitoring system 30 trains the ML model using the media data from the premises device 22b of a premises for which the water leak has been confirmed.

Remote monitoring system 30 may deploy the trained ML model to one or more devices, e.g., to control device 20, at step S220, to premises device 22b, at step S222, and other control devices 20 and/or premises devices 22 located at other premises associated with other premises monitoring systems 12. At step S224, control device 20 may use the deployed ML model to detect a water leak and, in response, perform an action to mitigate the water leak and/or damage that may occur from the water leak. As an example, control device 20 may cause an alarm signal to be transmitted to remote monitoring system 30 and/or mobile device 16 to alert a user and/or monitoring agent. As another example, control device 20 may attempt to stop the water leak by causing a water valve in the home to be closed. At step S226, premises device 22, which may be a camera with audio capabilities in various embodiments, may detect the water leak and perform an action to mitigate the water leak. For example, actions that premises device 22 may perform in response to detecting a water leak include alert actions and mitigating actions. An example of an alert action includes transmitting an alert message, at steps S228, S230, indicating that the at least one water leak has been detected. An example of a mitigating action includes causing a valve of the premises to close, open, adjust, stop throttling, etc.

Although FIG. 7 shows a control device 20, premises devices 22a, 22b, and a mobile device 16 as examples of devices corresponding to a premises monitoring system 12, the present disclosure is not limited as such, and remote monitoring system 30 may communicate with multiple devices of multiple premises monitoring systems 12 and perform any one of the steps of FIG. 7 for each premises monitoring system 12 or premises. For example, remote monitoring system 30 may receive premises data from multiple premises monitoring systems 12 and indications from multiple mobile devices 16 which confirm a leak at each premises. Further, remote monitoring system 30 may collect media from premises devices 22 from each premises monitoring system 12 where leaks have been confirmed, train an ML model, and deploy the model to each premises monitoring system 12 for detection and mitigation of leaks at each premises.

Figure 8:
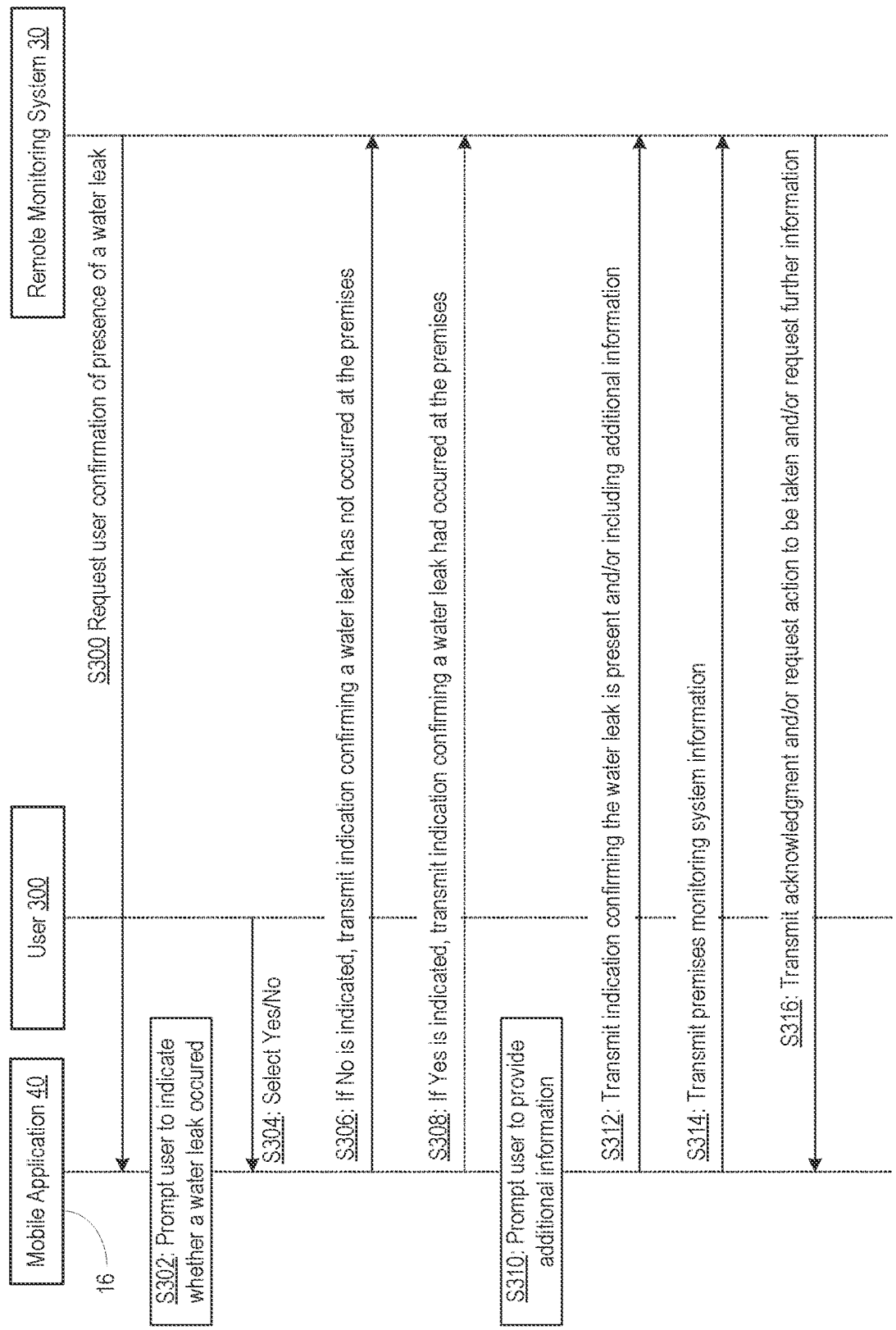
FIG. 8 is a sequence diagram depicting an example leak confirmation process performed by components of the system of FIG. 1 according to some embodiments of the present disclosure.

FIG. 8 is a sequence diagram depicting an example of a leak confirmation process according to some embodiments of the present disclosure. The example leak confirmation process depicted in FIG. 8 may be performed, for example, in response to receiving premises data indicating that a leak was detected in a premises monitored by premises monitoring system 12. Beginning at step S300, remote monitoring system 30 may transmit a message with a request to mobile application 40 of mobile device 16. The request may ask, via a user interface of mobile application 40, the user to confirm or indicate whether a water leak occurred at the premises. At step S300, mobile application 40 prompts the user 300 to provide the indication or confirmation. For example, the prompt may be a dialog box asking "Is there a water leak at the premises? Yes/No". At step S304, the user selects "Yes" or "No". At step S306, if the user selects "No", an indication may be transmitted to remote monitoring system 30 indicating that a water leak has not occurred at the premises. At step S308, if the user selects "Yes", an indication may be transmitted to remote monitoring system 30 indicating that a water leak had occurred at the premises. At step S310, mobile application 40 may prompt user 300 for additional information, such as information about the time and location of the water leak. Additionally, mobile application 40 may prompt user 300 to identify any premises devices 22 that may have captured information for the leak. For example, user 300 may select from a dropdown list one or more devices with cameras and/or microphones installed in the premises that may have captured media data, such as video and/or audio, of the leak event. At step S312, the indication may be transmitted after the user provides the additional information, e.g., instead of at step S308. The indication may include the additional information. At step S314, other information such as information about the corresponding premises monitoring system 12 may be transmitted to remote monitoring system 30. At step S316, remote monitoring system 30 may transmit an acknowledgement indicating that any of the information or indication transmitted at steps S306, S308, S312, or S314 has been received by remote monitoring system 30. In addition, a request may be transmitted which asks user 300 to perform an action or provide further information.

In some embodiments, premises data and indications of a water leak may be received from a group of premises monitoring systems 12, and media data and additional premises data may be collected from the group of premises monitoring systems 12. However, the trained ML models may be deployed to another group of premises monitoring systems 12 for detection and mitigation of water leaks on the premises corresponding to the other group of premises monitoring systems 12.

Although the term "water leak" has been used in some the embodiments, the embodiments of the present disclosure are not limited as such, and any other types of leaks and impending leaks may be detected and mitigated.

In some embodiments, the ML model may be trained to determine the type of leak based on characteristics of the fluid that is leaking. For example, a fluid may have certain characteristics when released from a pipe, when exposed to an environment, when fluid parameters exceed a predetermined threshold, etc. Characteristics may include color, shape, temperature, pressure, etc. In a nonlimiting example, when chlorine gas is released into the air, a cloud greenish yellow in color may be formed. Further, as chlorine gas is denser than air, the cloud of chlorine gas may move to and remain near the ground. Video or image data capturing the characteristics of the cloud of chlorine gas may be used to train ML models that can be later used to detect chlorine gas leaks. For example, when the characteristics are detected by a device with the deployed ML model, the device uses the ML to determine that a leak having such characteristics has occurred. In addition, changes in characteristics of other objects, materials, environments, etc. may be used to corroborate that a leak has occurred. In the nonlimiting example of chlorine gas, pipes or other metallic objects may show immediate signs of corrosion as chlorine is a highly corrosive gas. A premises device 22, such as a camera, may capture video or images of a metallic object showing signs of rapid corrosion, which may be used by the ML model to corroborate that the chlorine gas leak has occurred.

In some embodiments, corroboration of the leak may be performed by the ML model based on direct detection of the leak. For example, premises device 22 may be configured as a leak detector, e.g., configured with a catalytic surface that directly detects the presence of a fluid. The premises device 22 configured as a leak detector may detect the leak and use its own ML model to corroborate that the leak has occurred or transmit an indication to other devices, such as control device 20 or another premises device 22, for the other devices corroborate the presence of a leak using their ML models and the indication.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system configured to communicate with a plurality of premises monitoring systems, each of the plurality of premises monitoring systems being configured to monitor a respective premises, the system comprising:
   at least one processor; and
   at least one memory storing instructions that, when executed by the at least one processor, are configured to cause the at least one processor to:
   for each premises monitoring system of a first subset of the premises monitoring systems:
      receive premises data comprising flood sensor data indicating that a potential water leak was detected by a flood sensor at the premises;
      receive user confirmation data confirming that a water leak event occurred at the premises;
      in response to the user confirmation data, identify at least one camera associated with the premises monitoring system that captured video of at least a portion of the water leak event;
      collect the video captured by the at least one camera;
   train a machine learning (ML) model using the video collected from each premises monitoring system of the first subset of the premises monitoring systems; and
   deploy the ML model to at least a second subset of the plurality of premises monitoring systems for detecting a water leak.

2. A system comprising:
at least one processor; and
at least one memory storing instructions that, when executed by the at least one processor, are configured to cause the at least one processor to:
  receive user confirmation data confirming that a water leak event occurred at a premises being monitored by a premises monitoring system of a plurality of premises monitoring systems;
  in response to the user confirmation data, identify at least one camera associated with the premises monitoring system that captured video of at least a portion of the water leak event;
  collect media data from a plurality of premises devices of the premises monitoring system, the media data corresponding to the water leak event;
  train, using the media data, a machine learning (ML) model to generate a trained ML model; and
  deploy the trained ML model to at least one other premises monitoring system for detecting a leak.

3. The system of claim 2, wherein the instructions are further configured to cause the at least one processor to, for each other premises monitoring system of the plurality of premises monitoring systems:
  receive premises data indicating that a potential leak was detected;
  receive confirmation data confirming that a leak has occurred, the confirmation data comprising at least one of information about a location of the leak or information about the corresponding premises monitoring system; and
  collect the media data for training the ML model, the media data being based on the confirmation data.

4. The system of claim 3, wherein the confirmation data is based on user confirmation data obtained from a user device.

5. The system of claim 4, wherein the instructions are further configured to cause the at least one processor to, for each other premises monitoring system of the plurality of premises monitoring systems:
  in response to the user confirmation data, identify at least one premises device associated with the premises monitoring system, the media data being from the at least one premises device.

6. The system of claim 4, wherein the instructions are further configured to cause the at least one processor to identify at least one premises device for each other premises monitoring system of the plurality of premises monitoring systems based on information identifying the location of the leak.

7. The system of claim 4, wherein the instructions are further configured to cause the at least one processor to identify at least one premises device for each other premises monitoring system of the plurality of premises monitoring systems based on user data obtained from the user device that identifies the at least one premises device.

8. The system of claim 7, wherein the instructions are further configured to cause the at least one processor to deploy the trained ML model to execute on a control device of at least one of the plurality of premises monitoring systems.

9. The system of claim 2, wherein the media data from at least one premises device of the plurality of premises devices comprises video depicting water pooling on a floor.

10. The system of claim 2, wherein the media data from at least one premises device of the plurality of premises devices comprises video depicting water falling from a ceiling.

11. The system of claim 2, wherein the media data from at least one premises device of the plurality of premises devices comprises video depicting a ceiling sagging from water.

12. The system of claim 2, wherein the media data from at least one premises device of the plurality of premises devices comprises video depicting at least one of a ceiling or a wall discolored from water.

13. A method, comprising:
  receiving user confirmation data confirming that a water leak event occurred at a premises being monitored by a premises monitoring system of a plurality of premises monitoring systems;
  in response to the user confirmation data, identifying at least one camera associated with the premises monitoring system that captured video of at least a portion of the water leak event;
  collecting media data from a plurality of premises devices of the premises monitoring system, the media data corresponding to the water leak event;
  training, using the media data, a machine learning (ML) model to generate a trained ML model; and
  deploying the trained ML model to at least one other premises monitoring system for detecting a leak.

14. The method of claim 13, further comprising, for each other premises monitoring system of the plurality of premises monitoring systems:
  receiving premises data indicating that a potential leak was detected;
  receiving confirmation data confirming that a leak has occurred, the confirmation data comprising at least one of information about a location of the leak or information about the corresponding premises monitoring system; and
  collecting the media data for training the ML model, the media data being based on the confirmation data.

15. The method of claim 14, wherein the confirmation data is based on user confirmation data obtained from a user device.

16. The method of claim 15, further comprising, for each other premises monitoring system of the plurality of premises monitoring systems:
  in response to the user confirmation data, identifying at least one premises device associated with the premises monitoring system, the media data being from the at least one premises device.

17. The method of claim 15, further comprising identifying at least one premises device for each other premises monitoring system of the plurality of premises monitoring systems based on information identifying the location of the leak.

18. The method of claim 15, further comprising identifying at least one premises device for each other premises monitoring system of the plurality of premises monitoring systems based on user data obtained from the user device that identifies the at least one premises device.

19. The method of claim 18, further comprising deploying the trained ML model to execute on a control device of at least one of the plurality of premises monitoring systems.

20. The method of claim 13, wherein the media data from at least one premises device of the plurality of premises devices comprises video depicting at least one of:
- water pooling on a floor;
- water falling from a ceiling;
- the ceiling sagging from water; or
- at least one of the ceiling or a wall discolored from water.

\* \* \* \* \*